United States Patent [19]

Hoh

[11] Patent Number: 5,484,631
[45] Date of Patent: Jan. 16, 1996

[54] PRESS-THROUGH FOIL FOR PRESS-THROUGH PACKAGING

[75] Inventor: Manfred Hoh, Reute, Germany

[73] Assignee: Vereinigte Kunststoffwerke GmbH, Staufen, Germany

[21] Appl. No.: 245,998

[22] Filed: May 19, 1994

[30] Foreign Application Priority Data

May 25, 1993 [DE] Germany .......................... 43 17 326.8

[51] Int. Cl.$^6$ .......................... B32B 27/28; B65D 75/36; B65D 71/00
[52] U.S. Cl. .............................. 428/2; 428/337; 428/451; 428/516; 206/461; 206/484
[58] Field of Search .............................. 428/2, 451, 337, 428/516; 206/461, 484

[56] References Cited

U.S. PATENT DOCUMENTS

| | | | |
|---|---|---|---|
| 3,809,221 | 5/1974 | Compere | 206/461 |
| 4,211,326 | 7/1980 | Hein et al. | 428/215 |
| 4,973,375 | 11/1990 | Nishida et al. | 428/516 |
| 5,318,824 | 6/1994 | Itaya et al. | 428/178 |

FOREIGN PATENT DOCUMENTS

| | | |
|---|---|---|
| 0188123 | 7/1986 | European Pat. Off. . |
| 0090554 | 5/1988 | European Pat. Off. . |
| 0286407 | 10/1988 | European Pat. Off. . |
| 2335123 | 1/1974 | Germany . |
| 8710132 | 10/1987 | Germany . |

Primary Examiner—P. C. Sluby
Attorney, Agent, or Firm—Panitch Schwarze Jacobs & Nadel

[57] ABSTRACT

A press-through foil (2) for press-through packaging (1) is formed from a plastic mixture made up of such plastics that, in the melt and in the foil formed therefrom, they form at least two phases, that is non-homogeneities, so that the tensile strength and impact resistance are reduced. A packaged product can be appropriately easily pressed through this foil, but is completely sealed prior to that.

12 Claims, 1 Drawing Sheet

5,484,631

PRESS-THROUGH FOIL FOR PRESS-THROUGH PACKAGING

FIELD OF THE INVENTION

The invention relates to a press-through foil for press-through packaging, in which the press-through foil seals the packaged product, but can be torn open or broken open by pressing the packaged product through it.

BACKGROUND OF THE INVENTION

Generally, such press-through foils are made of metal, and are joined with a deep-draw film made of plastic in order, for example, to make it possible to individually remove medicaments in tablet form, without the other tablets being exposed to the atmosphere. Small parts, e.g. hardware, are also sold in packaging of this type, or in blister packaging. Serious difficulties arise if such packaging made from differing materials is reprocessed.

To be sure, it has been suggested from time to time that a press-through package be provided with a covering sheet made of paper, but then the protection for the packaged medicament is often not sufficient. Further, problems with recycling also arise, particularly since in that case paper often has to be coated, and adhesive can be necessary for joining the paper to the deep-draw packaging.

From DE-GM 91 03 973, a press-through package of the type mentioned at the outset is known, in which the front part and the back part are made of the same plastic. In order that these packages can be opened, the press-through foil is provided with a perforation that can be broken open, which means that the interior of this package is not tightly sealed.

Indeed, covering foils made of plastic have already been mentioned, for example, for the packaging of medicaments, but with these, a pressing through of delicate medicines in particular is, as a rule, not possible, or is not possible without damage to the tablets, which are often made available in capsule form. Plastic foils as covering foils for sealed packages have therefore not generally gained acceptance in practice.

SUMMARY OF THE INVENTION

The basic object of the invention is to provide a press-through foil of the type mentioned at the outset for press-through packaging, which, in spite of the fact that it can be torn open or broken open, encloses its contents in a tightly sealed fashion and, as a result of its barrier properties, protects them from spoiling.

The resolution of this apparently contradictory objective is achieved by selecting the material that forms the press-through foil as a mixture of plastics that forms at least two phases in the melt and in the foil formed therefrom.

Thus, two inherently incompatible plastics are mixed with one another and formed into the press-through foil, so that from this, there results a closed foil that is therefore well-suited for sealing, but which nevertheless has only a low tearing or impact resistance. In spite of the use of a plastic foil, which can be easily recycled along with the remaining plastic packaging, the possibility results of being able to easily press the packaged part through this press-through foil without the danger of damage, as well as without an unnecessary expenditure of force and without the use of tools. This is achieved by virtue of the fact that inherently incompatible plastics are mixed here.

To be sure, an adhesive tape with a carrier film made of plastic is already known from DE 37 10 670 A1, which can be easily torn or torn off with the fingers. However, this is based on the granularity of particle-like additives.

From DE 28 46 002 A1, a process is known for making polyolefin films more easily heat-weldable with the help of coating agents, whereby the coating agents can comprise PMMA. A press-through foil of the generic type with means for resolving the object stated above is not suggested from this.

The press-through foil can comprise a mixture of polyolefins and other polymers. In this regard, plastics can be used and mixed that form a multi-phase system, but in spite of this, can still be used together again or reprocessed.

The mixture of plastics that forms the foil can comprise a combination of 10% to 90%, preferably 40% to 70% polyolefins (non-polar polymers), and 90% to 10%, preferably 60% to 30% other polymers (polar polymers), all percentages herein being percent by weight. Depending on the choice of mixing ratio, various properties can be imparted or increased to a greater or lesser extent.

The plastic mixture that forms the foil can comprise polypropylene (PP) and/or polyethylene (PE) and/or ethylene vinylacetate (EVA), on the one hand, and polymethylmethacrylate (PMMA) and/or polyacrylonitrile (PAN) and/or acrylonitrile-butadiene-styrene block copolymer (ABS) and/or styrene-acrylonitrile block copolymer (SAN) and/or polyvinyl chloride (PVC), on the other. With these different plastics, foils with multiple phases can be produced which, as a result, have a suitable breakability or tearability when a packaged object is pushed through it.

It is expedient if the press-through foil is capable of being welded or sealed with other foils or the like. It can then be joined with a deep-draw or blister package without adhesive or a bonding layer being necessary, which is again favorable in terms of reprocessing or recycling. Of course, the press-through foil can also be coated with appropriate adhesives as well in order to produce a desired adhesion, for example to other foils.

Control or enhancement of specific properties can be effected by forming the press-through foil from a mixture which contains a larger proportion of PMMA, PVC, ABS, PAN, and/or SAN for welding to foils or the like made of PVC, ABS, PAN, or PS (polystyrene) without the use of bonding agents.

Another possibility comprises forming the press-through foil with a mixture containing a larger proportion of polyolefins for welding to PP foils or the like without the use of bonding agents.

To improve its barrier properties against gas, water vapor, and the like, the press-through foil can be coated or vapor deposited with, for example, PVDC (polyvinylidene chloride) or SiO (silicon oxide) or aluminum. Medicaments, for example, can thereby be packaged that are sensitive to moisture or that require a defined atmosphere inside the packaging.

The thickness of the press-through foil can be approximately 20 to 500 μ, and preferably about 60 to 300 μ. The ability of the foil to be pressed through can thus be influenced by the thickness of the foil as well.

Overall, from the combination of one or more of the features and measures described above, there results primarily a press-through foil by means of which tablets or other kinds of pharmaceuticals or small parts can be packaged in a tightly sealed manner, and that makes possible a material or thermal recycling of a package having this press-through foil in a substantially simpler manner than is the case when aluminum or other covering materials are used on plastic packaging. In practice then, a monopackage is created whose material can be appropriately well reused, while nevertheless the required ability of the foil to be pressed through easily is attained by means of the multiple phase system of the press-through foil.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the diagrammatical drawings:

FIG. 1 shows a blister package with a press-through foil as a rear closure, which has already been pressed through.

DETAILED DESCRIPTION OF PREFERRED EMBODIMENTS

Figure 1:
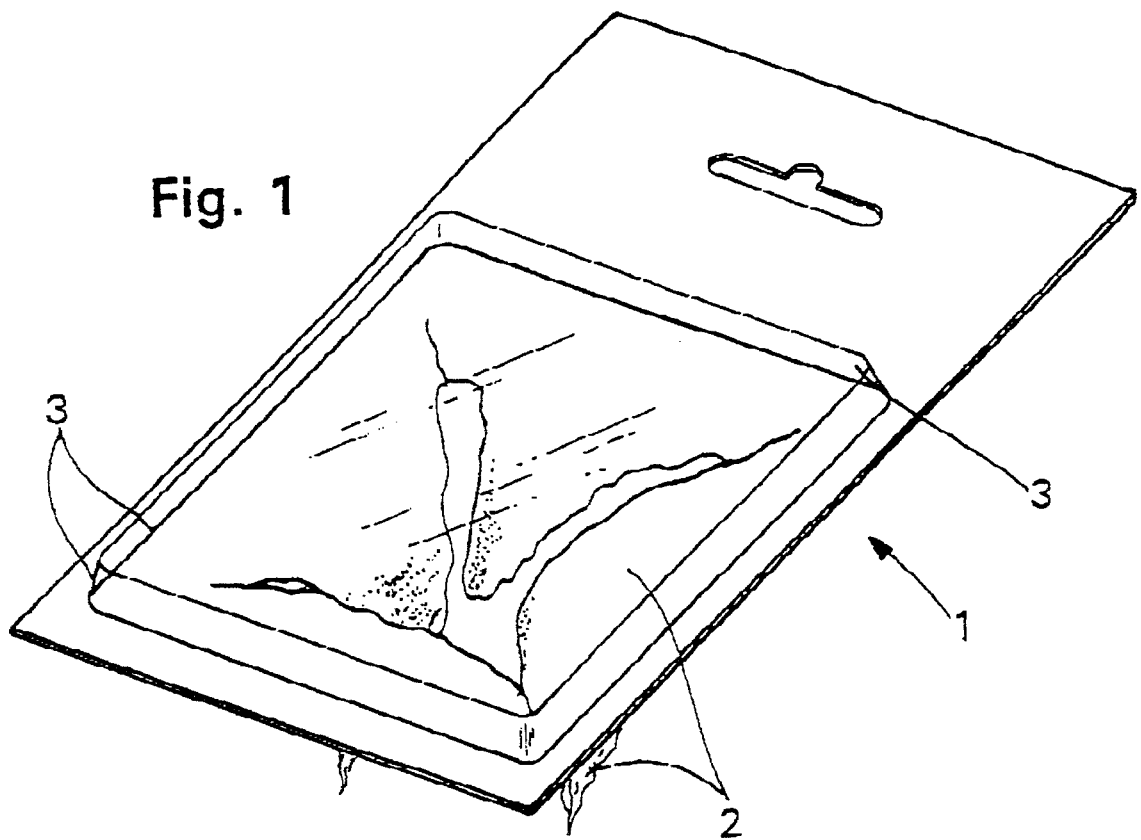
Figure 2:
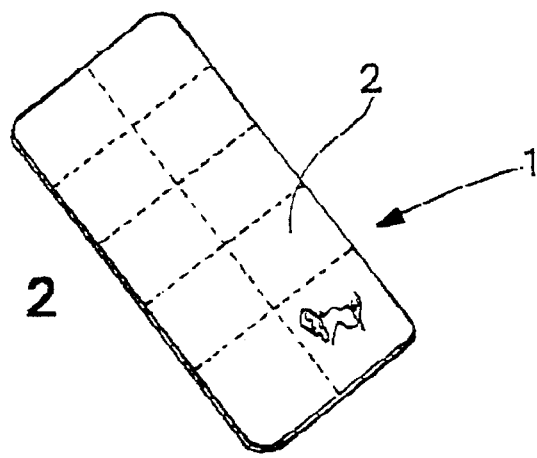
FIG. 2 shows a tablet blister package with press-through foil, from which one tablet has been taken.

A press-through package, designated generally as 1, can be configured either as a blister package or as a tablet blister package with individual deep-drawn compartments for the individual tablets. In both cases, the deep-drawn area for accepting a product or several tablets or the like is sealed by means of a press-through foil 2 that protects the packaged product and seals it in a moisture-proof or even air-tight fashion, but allows for easy removal of the packaged product by virtue of the fact that the product is simply pressed through the press-through foil 2. In FIGS. 1 and 2, a packaged product has already been pressed through press-through foil 2, so that this foil has been torn open or broken open.

The press-through foil in accordance with FIGS. 1 and 2 is a plastic foil or film, whereby the plastic is a mixture of such plastics that, in the melt and thereafter in the foil formed therefrom, they form at least two or more phases. As a result, there arise within the press-through foil 2 corresponding material differences that favor the breaking open and/or tearing open of the foil. Through the use of at least two different kinds of thermoplastics that are actually incompatible with each other, there arise, to a certain extent and from the beginning, break-off and/or tear-off locations that do not, however, have to be prefabricated as such in the form of weak points in the press-through foil 2.

In this way, after removal of the packaged product, the packages 1 allow not only a material recycling, but thermal recycling as well, without the necessity of carrying out a time-consuming separation of different materials and with less expenditure of energy than is the case, for example, with plastic packages whose press-through foil is made of aluminum. Thus, recycling of the material itself is possible for technical film applications (applications with poor performance/down-recycling). Similarly, if a small proportion of press-through foil (with poor physical properties) is mixed with the total packaging, parts or films with sufficient physical performance can be produced, and the impact strength of such parts or films can be improved by addition of a compatibilizer. Where recycling of the material itself is not feasible, thermal recycling by means of combustion (e.g., municipal waste incineration) with energy recovery is possible. The plastic press-through foil has a calorific value similar to that of oil.

In conjunction with this, the press-through foil 2 is welded with the blister 3 or the like without the use of bonding agents, since the plastic mixtures make possible a suitable weldability or sealability with the plastic blister. Depending upon the choice of composition of the plastic mixture for the press-through foil, and on the choice of thickness of this press-through foil 2 as well, the ability of the packaging to be pressed through or to be tightly sealed, as well as its ability to be welded, can be influenced and adapted to the requirements at hand.

No special mixing is required for the two plastic components of the mixture, but distribution of the two different phases within each other must be sufficient for good foil processing. This can be achieved by the use of fluid mixers by which the granules of plastic raw material and additives are mixed together (dry blended) as a first step. This mixture is then plastified, for example in planetary gear extruders, screw extruders, or other plastification aggregates, in order to achieve good blending. The foil or film is then formed by conventional calendaring, optionally with the use of chill rolls.

In addition to the two plastic components, the mixture for forming the foils of the present invention may also include other plastics and fillers to further modify the properties of the foil. For example, chalk may be added as a filler, which will also further weakens the tear resistance and other physical properties of the foil. Various additives may also be included in the mix, which are known or conventional in the plastics art, including, for example, internal and external lubricants, antioxidants or stabilizers, processing aids, colorants, etc.

The invention will now be further described with reference to the following specific, non-limiting examples.

EXAMPLE A

A plastic composition with a major proportion of polyolefin was prepared by first mixing all of the following components and additives together in a fluid mixer until a well mixed dry blend was achieved.

| Components | |
|---|---|
| 50% | Polyproylene; MfI-value (230° C.; 2.16 kp) = 2–4 |
| 25% | SAN (styrene-acrylonitrile block copolymer) |
| 25% | Chalk (CaCO$_3$) |
| Additives | |
| 1.5% | LLDPE (linear low density polyethylene |
| 0.4% | Pentaerythritol-ester (external lubricant) |
| 0.2% | Montan-Wax (external lubricant) |
| 0.1% | Antioxidant (stabilizer) |
| 7.0% | TiO$_2$ (Colorant) |

This dry blend was then plastified in a planetary gear extruder at a temperature of 210° C. A press-through foil or film was then prepared from this melt by a conventional calendaring process at a temperature of 200° C. followed by a set of chill rolls. The resulting film was suitable for welding to polypropylene foils or the like without the use of bonding agents.

EXAMPLE B

A film or foil having a major proportion of PVC was formed by blending the following components and additives in the same manner as in Example A.

| Components | |
|---|---|
| 55% | suspension-PVC |
| 10% | emulsion-PVC |
| 10% | PVC-Vinylacetate-copolymers |
| 25% | LLDPE |
| Additives | |
| 1.10% | Octyl-Sn-Stabilizer |
| 0.75% | Glycerine-dioleate (internal lubricant) |
| 0.75% | Acrylic-processing-aid |
| 0.20% | Pentaerytritol-adipate stearate (external lubricant) |
| 0.15% | Pentaerythritol-ester (external lubricant) |
| 7.00% | $TiO_2$ (colorant) |

The above blend was then plastified in a planetary gear extruder at 180° C. and formed into a film in a conventional calendaring process at 200° C. followed by a set of chill rolls. The resulting film was suitable for welding to foils of PVC, ABS, PAN or PS without the use of bonding agents.

The press-through foil 2 for press-through packaging 1 comprises a plastic mixture made up of such plastics that, in the melt and in the foil that is formed therefrom, it forms at least two phases, that is non-homogeneities, so that the tensile strength and impact resistance are reduced. A packaged product can be appropriately easily pressed through this foil, but is completely sealed prior to that.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A press-through foil (2) for press-through packaging (1) in which the press-through foil (2) seals the packaged product, but can be torn open or broken open by means of pressing the packaged product through the foil, said foil comprising a material which is a mixture of plastics that form at least two phases in the melt and in the foil formed therefrom, the plastic mixture comprising a first polymer selected from the group consisting of polypropylene, polyethylene, and ethylene vinylacetate, and a second polymer selected from the group consisting of polymethylmethacrylate, polyacrylonitrile, acrylonitrile-butadiene-styrene block copolymer, styrene-acrylonitrile block copolymer, and polyvinyl chloride.

2. A press-through foil according to claim 1, wherein the second polymer is incompatible with the first polymer.

3. A press-through foil according to claim 1, wherein the mixture of plastics comprises 10% to 90% of the first polymer and 90% to 10% of the second polymer, said percentages being percent by weight.

4. A press-through foil according to claim 3, wherein the mixture comprises 40% to 70% of the first polymer and 60% to 30% of the second polymer, said percentages being percent by weight.

5. A press-through foil according to claim 1, wherein the foil is weldable or sealable to another plastic foil.

6. A press-through foil according to claim 5, wherein the mixture contains a larger weight percentage of the second polymer than of the first polymer to allow weldability without bonding agents to another foil selected from the group consisting of polyvinyl chloride, acrylonitrile-butadiene-styrene block copolymer, polyacrylonitrile and polystyrene.

7. A press-through foil according to claim 5, wherein the mixture contains a larger weight percentage of the first polymer than of the second polymer to allow weldability without bonding agents to a polypropylene film.

8. A press-through foil according to claim 1 wherein the foil is coated with a material selected from the group consisting of polyvinylidene chloride, SiO and aluminum to improve the barrier properties of the foil against gas and water vapor.

9. A press-through foil according to claim 8, wherein the coating is a vapor deposition coating.

10. A press-through foil according to claim 1, wherein the foil has a thickness of approximately 20 to 500 μ.

11. A press-through foil according to claim 10 wherein the foil has a thickness of approximately 60 to 300 μ.

12. A tightly sealable press-through package consisting essentially of material or thermal recyclable plastics and comprising a plastic blister having an opening for receiving goods to be packaged and a press-through foil welded to said blister to seal the opening of the blister after goods have been placed therein, said press-through foil comprising a material which is a mixture of plastics that form a least two phases in the melt and in the foil formed therefrom, the plastic mixture comprising a first polymer selected from the group consisting of polypropylene, polyethylene, and ethylene vinylacetate, and a second polymer selected from the group consisting of polymethylmethacrylate, polyacrylonitrile, acrylonitrile-butadiene-styrene block copolymer, styrene-acrylonitrile block copolymer, and polyvinyl chloride.

* * * * *